United States Patent [19]

Cobbs, Jr. et al.

[11] 4,156,754
[45] May 29, 1979

[54] METHOD OF MAKING FOAMED THERMOPLASTIC ADHESIVE MATERIALS AND ADHESIVE PROCESS THEREFOR

[75] Inventors: Walter H. Cobbs, Jr., Amherst; Robert G. Shong, Avon Lake, both of Ohio

[73] Assignee: Nordson Corporation, Amherst, Ohio

[21] Appl. No.: 791,338

[22] Filed: Apr. 27, 1977

[51] Int. Cl.² .............................................. B32B 5/18
[52] U.S. Cl. ..................................... 428/310; 156/78; 156/309; 222/146 HE; 264/45.3; 264/50; 264/46.5; 427/373; 428/322; 521/908; 521/911
[58] Field of Search .................. 156/78, 311, 309; 427/373; 428/310, 320, 314, 322; 264/45.3, 50, 46.5; 260/2.5 R, 2.5 AG; 222/146 HE, 372

[56] References Cited

U.S. PATENT DOCUMENTS

| | | | |
|---|---|---|---|
| 2,323,831 | 7/1943 | Menger et al. | 260/2.5 R |
| 2,860,377 | 11/1958 | Bernhardt et al. | 264/50 |
| 2,909,493 | 10/1959 | Bush | 260/2.5 R |
| 2,928,130 | 3/1960 | Gray | 264/50 |
| 3,140,266 | 7/1964 | Peticolas | 260/2.5 R |
| 3,151,427 | 10/1964 | Meissner et al. | 260/2.5 R |
| 3,181,199 | 5/1965 | Voelker | 156/78 |
| 3,251,092 | 5/1966 | Printz | 264/50 |
| 3,270,032 | 8/1966 | Erner | 260/2.5 AG |
| 3,376,236 | 4/1968 | Erner | 260/2.5 AG |
| 3,823,104 | 7/1974 | Bondy et al. | 260/2.5 R |

Primary Examiner—John T. Goolkasian
Assistant Examiner—J. J. Gallagher
Attorney, Agent, or Firm—Wood, Herron & Evans

[57] ABSTRACT

Foamed thermoplastic materials such as coatings, adhesives and structural bodies are made by a method which offers significant advantages and economies. The method involves the steps of stabilizing a dispersion of gas in a molten thermoplastic material by adding a surfactant to the molten material in a sufficient stabilizing amount and subsequently pressurizing the stabilized dispersion to form a hot solution. Thereafter, the hot solution is dispensed under lower pressure whereby the gas is released from solution to form a foamed material. The method is especially advantageous in making hot melt thermoplastic adhesives which are very useful in bonding substrates with efficiency and superior bond strengths. Continuous and reliable foaming operations are achieved with a uniform quality and output of foamed materials. Thermoplastic materials are also capable of being foamed with relatively simple mechanical apparatus and under conditions which provide considerable savings of energy. The number of thermoplastic materials which can be foamed employing the present technique in a controlled manner is unlimited. The method of stabilization is conducted at low or ambient pressures and resulting stabilized hot thermoplastic-gas dispersions may then be pumped with pressurization and dispensed with immediate foaming.

36 Claims, 9 Drawing Figures

METHOD OF MAKING FOAMED THERMOPLASTIC ADHESIVE MATERIALS AND ADHESIVE PROCESS THEREFOR

BACKGROUND OF THE INVENTION

The art of making cellular thermoplastic products is very well developed. It has long been known, for example in extrusion and molding processes, to form expanded thermoplastic products having a cellular structure by the injection of a gas under pressure into molten thermoplastic materials. Of the more recent patent literature, U.S. Pat. Nos. 2,928,130; 3,268,636; 3,436,446 and 3,975,473 are examples of such processes. These patents, however, are merely illustrative and it is not intended to suggest that they are the only or most pertinent background patents. Such patents disclose the widely used technique of injecting gas under high pressures into an extruder or barrel for solubilization in a thermoplastic melt, followed by discharge of the melt under reduced pressure thereby resulting in the production of foam. Commonly, the gas is introduced under pressures at least from about 500 psi to about 3000 psi into the extruder or molding apparatus. Thus, it is an objective in processes of this type to achieve immediate solubilization of the gas into the hot melt under pressure. There are variations in these known processes including the employment of additives, such as nucleating agents for the production of cellular thermoplastic bodies. Nucleating agents provide nucleating sites for the gas cell formation during the expansion or blowing of the molten thermoplastic materials.

Techniques are disclosed for making hot melt thermoplastic adhesive foams in U.S. application Ser. No. 710,377, filed Aug. 2, 1976 entitled "Hot Melt Thermoplastic Adhesive Foam System" now U.S. Pat. No. 4,059,714 and U.S. application Ser. No. 710,378, filed Aug. 2, 1976 for "Hot Melt Thermoplastic Adhesive Foam System" now U.S. Pat. No. 4,059,466, which applications are assigned to the assignee of this application. These applications are directed to methods of making and using hot melt foamed adhesives which offer significant improvements over conventional non-foamed adhesives. According to the techniques described in these applications, the gas is intimately mixed with a thermoplastic adhesive while the adhesive is in a molten state and then the mixture is pressurized to form a solution which, upon dispensing at a lower pressure, releases the gas and foamed adhesive results. The techniques described in these applications result in very useful foamed adhesives and bonding techniques. However, such techniques are not entirely satisfactory in producing hot melt thermoplastic adhesives on a continuous, uniform quality basis. Such techniques have also been found to be limited in their applicability to hot melt thermoplastic materials and further improvements are needed.

SUMMARY OF THE INVENTION

This invention in one of its main aspects is predicated upon the discovery that dispersions of gas in a molten thermoplastic material can be stabilized by the incorporation of a surfactant in the molten material in a sufficient stabilizing amount. It has been found that by the incorporation of soluble or solid phase surfactant materials, gas can be dispersed as bubbles in a molten thermoplastic and sufficient time stability is achieved to allow the dispersion to be pumped and then pressurized with simple means for solubilization of the gas. Dispensing of the solution, with release of pressure, produces immediate foaming of the thermoplastic material. Thus, in contrast to the known prior art processes which require injection of gas under pressure, several hundred to several thousand psi, this invention in one of its aspects eliminates the necessity for such sources of high pressure gas and equipment to handle such pressure injection foam techniques.

In another aspect of a broad concept involved in this invention, it has been found quite surprisingly that dispersions of gas can be stabilized in hot polymeric materials at temperatures on an order of about 300°–500° F., and more, under low or atmospheric pressure conditions. The resulting dispersions are stabilized for significant periods of time to allow for subsequent pressurization by simple mechanical means including pumps for pressurized dissolution, flow transfer, dispensing and foaming with ease and simplicity. It is recognized that others may have heretofore employed surfactants in aqueous liquid-gas mixtures to produce foams. However, to applicants' knowledge, it has not heretofore been reported that dispersions of gas in hot thermoplastic materials may be stabilized by the employment of a surfactant. Furthermore, it has not been appreciated that such stabilization or activity can be applied to serve many useful and unique purposes as described herein. Indeed, employing the principles of this invention, significant improvements are achieved in thermoplastic foamed materials for use in coatings, adhesives, structural bodies and many other areas. The simplified techniques and energy savings make possible a wide utilization of this invention.

Another and significant feature of this invention is its applicability to unlimited classes of thermoplastic materials which for one or more reasons may not be suitable for foaming. Moreover, by the method of this invention such diverse thermoplastic materials may be reliably foamed with a uniform quality output of low density foamed thermoplastic material. Process stability and foam properties can be controlled throughout processing in a continuous manner.

Very significantly, in a more preferred mode, the stabilization technique of this invention includes the use of a fluid pressure energy translating device, i.e., a simple single or multi-stage gear or piston pump, as the pressurizing means. It has been found that the uniform predispersion and stabilization of the gas in the polymeric melt allows for constant pressure solubilization by such a device. Stable dispersions can thus be introduced at the pump intake without gas-locking the pump. Therefore, in this preferred mode, in contrast to prior art processes employing a pressurized gas source and sophisticated devices, atmospheric air and a simple pump offer considerable reduction in cost.

It has been empirically determined that the life or stability of a hot thermoplastic foam is extended by the incorporation therein of a surfactant even in a very minor amount. Surfactants have been employed which are either soluble in the melt or insoluble, in a finely divided solid state, and stabilization can be achieved. A further advantage of employing a solid phase surfactant is the formation of gas bubbles when pressure is released from the melt composition containing the dissolved gas. Solid phase surfactants have been found to provide and function as nucleating centers. Such nucleating centers lead to more, and smaller, bubbles, more quickly formed from the same amount of dissolved gas. In the absence of nucleating centers, foaming may be and often is delayed after the time of release of pressure. Thus, process versatility where foam delays are desired may be achieved by controlling such nucleating centers.

Synergistic stabilizations have been achieved by a combination of soluble and solid phase surfactants. In other words, the life or stability of a gas dispersion in a hot thermoplastic material has been extended far beyond the expected life of the algebraic sum of the stability of each component alone in the hot melt composition. It has also been established that the surfactants suitable for use in accordance with the principles of this invention can be anionic, cationic and nonionic types. Versatility, therefore, of both polymeric materials and surfactant compositions are achieved in accordance with this invention, thereby enabling stabilization of broad classes of thermoplastic materials and compositions with varying physical and chemical characteristics.

In another of its unique aspects, the invention provides a method of process regulation by controlling the variables of surface tension, viscosity, and gas solubility at operating temperatures of the molten material. Surface tension of the molten material is controlled within the range of about 10 to about 40 dynes/cm., preferably about 15 to about 25 dynes/cm. The viscosity of the melt is controlled within a range of about 500 to about 1,000,000 cps., preferably about 1,000–100,000 cps. The gas solubility at dispensing pressure is controlled within the range of about ½ to about 20 cm.$^3$ gas/gm. of thermoplastic material. Thus, a polymeric composition qualifying for use can be determined by measuring its viscosity, surface tension and solubility. If the viscosity falls below 500 centipoise at application temperature, then higher molecular weight polymer could be increased to raise viscosity to within the specified range. Also, if a diluent is in use, less diluent should be used to increase viscosity. The surface tension may be controlled to within the desired range by the addition of surfactants to the hot melt. Solubility of the gas chosen must be sufficient in the polymeric material to give the useful results. A useful scale is derived from the density of the foamed material as a percent of the density of the unfoamed material and this percentage is a function of the gas solubility at a particular temperature, pressure and composition of the adhesive.

DETAILED DESCRIPTION

A "thermoplastic material", as that term is used and understood to those skilled in the art, includes any natural or synthetic thermoplastic polymer or polymeric compositions. A thermoplastic material is a normally solid or semi-solid material at use temperatures and it melts or liquifies upon heating to a higher temperature. Upon cooling the material solidifies or returns to a solid or semi-solid state. As also used in this description, the term "thermoplastic hot melt adhesive" or "hot melt adhesive" is a term which is well known in the art and this material has the same characteristics of liquification upon heating and, upon cooling, solidification to a solid, semi-solid or tacky state. Examples of thermoplastic materials include polymers of ethylenically unsaturated monomers, such as polyethylene, polypropylene, polybutylenes, polystyrenes, poly (α-methyl styrene), polyvinyl chloride, polyvinyl acetate, polymethyl methacrylate, polyethyl acrylate, polyacrylonitrile and the like; copolymers of ethylenically unsaturated monomers such as copolymers of ethylene and propylene, ethylene and styrene, and polyvinyl acetate; styrene and maleic anhydride; styrene and methyl methacrylate; styrene and ethyl acrylate; styrene and acrylonitrile; methyl methacrylate and ethyl acrylate and the like; polymers and copolymers of conjugated dienes such as polybutadiene, polyisoprene, polychloroprene, styrenebutadiene rubber, ethylene-propylene-diene rubber, acrylonitrile-styrene butatiene rubber and the like; saturated and unsaturated polyesters including alkyds and other polyesters; nylons and other polyamides; polyesteramides and polyurethanes; chlorinated polyethers, epoxy polymers, cellulose esters such as cellulose acetate butyrate, and the like. The term "thermoplastic material" is sometimes used herein interchangeably with "hot melt", "melt", "hot melt thermoplastic" or "hot melt adhesive". It is, of course, to be appreciated that all these compositions are characterized by their thermoplastic nature as above defined. In view of the advantages secured by this invention, modifications of the hot melt and thermoplastic compositions suitable for use herein will become apparent.

A number of thermoplastic or hot melt adhesive compositions are employed in the operating examples which follow. These and other materials are sometimes identified by trademarks. However, certain of such trademarked materials are defined in *The Condensed Chemical Dictionary*, 8th Edition, Revised by G. G. Hawley, Van Nostrand Reinhold Company, Library of Congress Cat. Card No. 75-133848 (1971). Thus, these definitions are incorporated herein by reference. For example, "ELVAX" is a copolymer of ethylene vinylacetate (EVA) by DuPont. A conventionl polyethylene based adhesive composition is "Eastabond A-3", manufactured by Eastman Chemical Company. In addition, "AC 635" is another polyethylene based composition by Allied Chemical. "Terrell 6100" is a polyester composition and "A-FAX 500" is a polypropylene polymer by Hercules. Polyamides are sold under the trademark "Versalon 1138" by General Mills.

Surfactants, as mentioned above, which have been found to possess the desirable stabilizing activity are selected from the classes of anionic, cationic, and nonionic agents, or mixtures thereof. Also, as mentioned, the surfactants can be soluble or dispersible in the melt, or insoluble, as a finely divided solids phase. An anionic surfactant contains a negatively charged ion-containing portion and an oil dispersible cationic portion in the surfactant molecule as is well known. The surfactant of the anionic type may be (1) of the group of saponified fatty acids or soaps, or (2) of saponified petroleum oil such as sodium salts or organic sulfonates or sulfates or (3) of saponified esters, alcohols or glycols, with the latter being well known as anionic synthetic surfactants. Examples of these anionic surfactants include the alkaryl sulfonates or amine salts thereof such as sulfonates of dodecyl benzene or diethanolamine salt of dodecyl benzene sulfonic acid. Most of these sulfonates contain many chemical species. The class name given to most of them is "alkylaryl sulfonate". Simply, this means that a paraffinic hydrocarbon is bonded to an aromatic or benzene nucleus and the aromatic portion has been sulfonated. Examples of saponified fatty acids ($C_6$-$C_{24}$) are the sodium or potassium salts of myristic, palmitic, stearic, oleic or linoleic acids or mixtures thereof. Also in this class of anionic surfactants are alkali and alkaline earth metal salts of neutral phosphoric acid esters of oxylalkylated higher alkyl phenols or aliphatic monohydric alcohols. "Aerosol OT" is a dioctyl alkali metal sulfosuccinate anionic surfactant made by Cyanamide. The nonionic surfactants suitable for use commonly have hydrophylic portions or side chains usually of the polyoxyalkylene type. The oil soluble or dispersible part of the molecule is derived from either fatty acids, alcohols, amides or amines. By suitable choice of starting materials and regulation of the length of the polyoxyalkylene chain, the surfactant parts of the nonionic detergents may be varied as is well known. Suitable examples of nonionic surfactants include alkylphenoxy polyoxyethylene glycol, for example, ethylene oxide adduct of either octyl-, nonyl- or tridecyl- phenol and the like. These mentioned nonionic surfactants are usually prepared by the reaction of the alkyl phenol with ethylene oxide. Commercial products are sold under the trademarks "Triton X-100" by Rohm and Haas Co. or "Tergitol" by Union Carbide and Carbon Corp. which are alkyl phenyl ethers of polyethylene glycol. Other specific examples of nonionic surfactants include glyceryl monooleate, oleyl monoisopropanolamide sorbitol dioleate, alkylol amides prepared by reacting alkanolamides such as monoisopropanolamine, diethylanolamine, or monobutanolamine with fatty acids such as oleic, pelargonic, lauric and the like. The cationic surfactants are also well developed and mainly include betaines and quaternary ammonium compounds. Some specific examples of betaines include imidazoline betaines, aliphatic and carbocyclic betaines, and betaines with hetero atoms in the hydrophobic chains such as dodecyloxypropyldimethyl aminoacetic acid. Typical of the quaternary ammonium compounds that may be mentioned are dimethyl dicoco ammonium chloride, cetyl pyridinium acetate, methyl cetyl piperidinium propionate, N,N dilauryl, N,N dimethyl ammonium diethophosphate, and the like. Thus, it will be understood that other anionic, cationic or nonionic surfactants may be employed in accordance with the principles of this invention. In addition, solid surfactants may be employed. Stabilization activity has been achieved with such finely divided solid surfactants as titanium dioxide, carbon black, silicon dioxide, fused silica ("Cab-O-Sil" by Cabot Corporation), iron oxide, chromium oxide, aluminum oxide, clay and the like. These solid phase surfactants also behave as nucleating agents upon release of pressure and dispensing of the solubilized gas and hot melt composition to produce immediate foaming.

The amount of stabilizing surfactant employed in the thermoplastic material composition will vary of course depending upon the type of surfactant, the type of thermoplastic material or polymer base being stabilized, the conditions of operation and the like as will be further amplified by the specific operating examples which follow. Generally, however, the surfactant is only necessary in a minor effective amount of about 0.1 to about 5% by weight of the melt, usually about 0.25 to about 1% by weight. Where the soluble surfactants are employed in combination with the solid phase surfactants in order to achieve superior and even synergistic results, the soluble surfactant is usually employed in the range of about 0.1 to about 5% by weight and the solid surfactant is usually employed in the range of about 0.01 to about 1% by weight. Again, these proportions are very relative and depend upon the specific composition in question and effects desired. As a general guide, it has been found that about 1% of soluble surfactant in combination with 0.1% of solid phase surfactant may be suitably used to provide low density, fine cellular foamed materials.

The above described thermoplastic formulations are employed in the method of this invention by pressurization of the stabilized dispersion of gas therein, followed by subsequent dispensing to produce a foam. Where that foam is intended as a structural body, it may be introduced into a mold to produce varying types of structural bodies. Where the use is intended as an adhesive, apparatus disclosed in the above mentioned copending applications Ser. Nos. 710,377 and 710,378 may be employed. In comparison, however, to the techniques disclosed in said applications, this invention achieves stabilizing effectiveness and control of hot melt adhesive applications. More significantly, as mentioned, this invention insures control of the essential variables of surface tension, viscosity, and gas solubility. The surfactant stabilizes the inner phase between the liquid hot melt and the dispersed gas bubbles to achieve the sufficient time stability, allow pumping, dissolving, flow transfer, dispensing and immediate foaming. For instance, following the techniques disclosed in the mentioned applications, a polyethylene "A-3" adhesive is foamable and produces a satisfactory adhesive bond. However, formulation additions of solid and soluble surfactants, for instance Triton X-100 and fused silica, have resulted in improved foams over those made without such additions. The improved foams have lower foam densities, more uniform and finely divided cells, and provide excellent penetration and bonding of substrates. Moreover, by employing the surfactant stabilization technique of this invention, immediate foamability can be achieved and controlled in a fashion which heretofore has not been obtainable. Thus, in accordance with the discoveries and principles of this invention, foamed hot melt adhesives having maximum bonding characteristics are achieved by controlling and stabilizing the dispersion of the gas in the hot melt by uniformly distributing surfactant materials throughout the melt for subsequent compression of the melt and release to produce foams having greater bonding strengths with minimum amounts of adhesive.

In addition to the variability in polymer formulations, different types of gases may be employed in this method including air, nitrogen, oxygen, carbon dioxide, methane, ethane, butane, propane, helium, argon, neon, fluorocarbons such as dichlorodifluoroethane, monochlorotrifluoromethane, or other gases, or mixtures of any of these gases. Such gases can be varied again according to the types of thermoplastic materials employed, conditions and availability of materials. As developed above, such gases can be introduced at low pressure, i.e., ambient or atmospheric up to several pounds per square inch. Various means for melting the adhesive formulations may be used, as exemplified in said copending applications, or equivalent. Various means for dispersing the gas may be used including but not limited to simple tubes connected to a gas supply, tubes having sintered porous metal tips, perforated baffle plates and motor driven rotary dispersators, to mention a few. Many means for pressurizing and pumping the molten adhesive can be employed. As mentioned above, one of the main advantages of this invention is the enablement of a simple pump to serve as the pressurizing and transfer means. Such means may operate at pressure from about 100 to about 2000 psig, preferably in the case of a molten adhesive in the area of about 300 to about 1800 psig. Any suitable means may be employed to dispense the pressurized molten materials onto substrates or into molds as are well known in the art and industry.

In the formulation of the melt adhesive or thermoplastic materials, a particular thermoplastic material as mentioned is qualified by measuring its viscosity, surface tension and gas solubility. The viscosity was measured in the following examples at application temperatures following ASTM D3236 (thermosel viscosity). The surface tension was measured following the method of R. H. Dittre, et al, *J. Colloid and Interface Sci.*, 21 367–377 (1966). The solubility of the gas for foaming is measured following the method of D. D. Bonner, et al, *J. Polymer Sci., Polymer Letters Ed.*, 13, 259 (1975).

The principles of this invention will be further understood with reference to the following detailed examples and the drawing in which.

Figure 1:
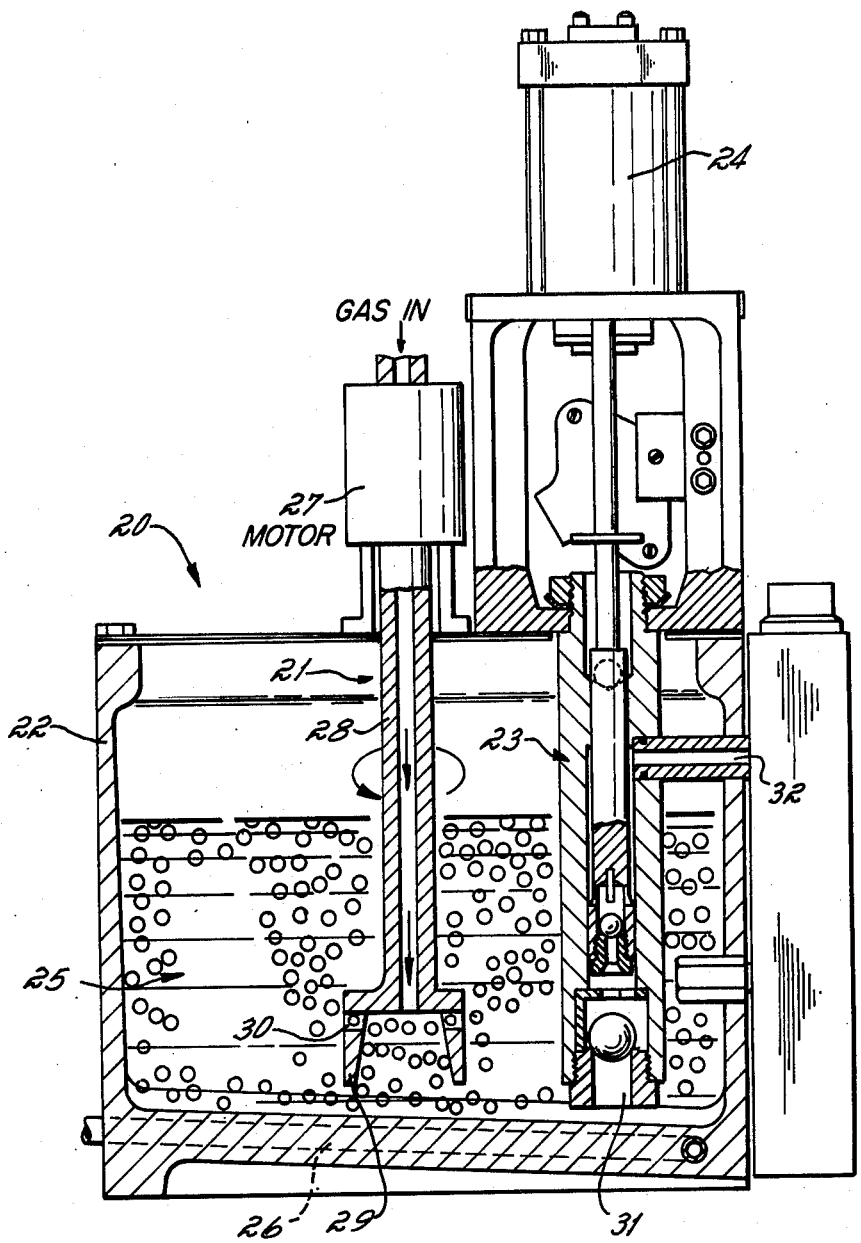
FIG. 1 is a view in section of a thermoplastic melt apparatus useful in the practice of the invention.

Referring to FIG. 1 of the drawings, one form of an apparatus for performing the method is shown. The device employs a reciprocating piston-type pump and further details thereof may be obtained by referring to U.S. Pat. No. 3,585,361, issued June 15, 1971 and assigned to the assignee of this application. The disclosure of this patent is incorporated herein by reference. The structure 20 shown for injecting and mixing gas into a molten thermoplastic material includes a rotary gas injector-mixer 21 disposed in the reservoir or tank 22. The piston pump 23 is attached to the top of the reservoir 22 and is driven by an air operated or electric motor 24. The lower end of the pump 23 is disposed in the molten thermoplastic material 25 which is heated by the heaters 26 mounted in the bottom wall of the tank 22. The injector-mixer has a hollow drive shaft 28 having one end attached to and driven by the motor 27 and a cup-shaped element 29 formed on the opposite end thereof. The motor 27 rotates shaft 28 as gas from an air supply at atmospheric or several pounds pressure is forced downwardly through the hollow shaft 28 into the cup-shaped element 29 and flows out through a plurality of radial outlets ports 30 formed in the side wall of cup 29. As the gas flows from the ports 30 into the hot melt composition 25 according to this invention, it forms a stable dispersion of gas bubbles throughout the molten thermoplastic material 25. This dispersion is only diagramatically illustrated by the bubbles shown. As the pump reciprocates, the thermoplastic material containing gas bubbles is drawn into the pump inlet port 31, compressed and discharged through the outlet port 32 in the manner described in U.S. Pat. No. 3,585,361.

The process is operated by introducing a thermoplastic material composition meeting the formulation criteria into tank 22. The power to the heaters 26 is turned on and the thermoplastic material melted at the melt or application temperature. Atmospheric air from about 0–10 pounds pressure is supplied to the hollow drive shaft 28. Power is then supplied to drive the rotary mixer 21. Air bubbles of varying size are thus dispersed, and stabilized in the melted thermoplastic material by the mixer. The liquid with dispersed bubbles is drawn into the pump inlet port 31. In the pump, the liquid and gas bubbles are compressed into a single liquid phase and delivered at a regulated pressure through the outlet port 32. In an adhesive application system, the hot melt adhesive would be delivered through a heated hose and then to a dispensing valve and nozzle in a manner not shown. As the hot melt material is delivered fron the outlet port or dispensing valve, it foams in a very short time due to the high pressure being released on the melt material containing dissolved gas. In the event that the melt composition of this invention is employed as an adhesive, the adhesive may be applied as a ribbon onto, for example, corrugated packaging box flaps. The ribbon will swell in volume and, when the box flaps are pressed together, foamed adhesive flows therebetween easily and fully. By reason of the characteristics of the foamed thermoplastic material, it penetrates the pores of the paper as it spreads, losing the gas content of the foam through the pores until the glue line reaches the set (no flow) point temperature. Employing thermoplastic adhesive compositions of this invention, the resulting glue line is stronger, is formed faster, uses less glue and is substantially free of bubbles in its final state.

Additional formulated thermoplastic material or adhesive compositions may be added to the tank 22 to replenish that pumped. The gas supply through the mixer 21 may be adjusted to control the proportion of the gas to the thermoplastic composition. Should the proportion of gas to the thermoplastic material exceed the solubility of the gas in the material at the pressure set by a regulator for the application temperature, the amount of gas can be reduced. Otherwise the gas phase will tend to accumulate in the pump, interrupt its operation and also interrupt the thermoplastic flow. The optimum condition of operation exists when the gas supply to adhesive ratio is equal to gas solubility at the application temperature and the regulated set pressure. Under these circumstances, the thermoplastic adhesive may be delivered to foam on a surface or substrate for bonding at lowest density without interruption and with maximum efficiency.

In order to evaluate the stabilizing effectiveness of the method of this invention, the foam life of a number of hot melt thermoplastic materials was determined employing surfactants in accordance with the principles of this invention. For this purpose, reference is made to the Table which follows in which a number of thermoplastic materials including ethylene vinylacetate, polyethylene, polyester, polypropylene, and polyamide were employed.

TABLE

| Adhesive Type | Soluble Surfactant | % by wt. | Solid Surfactant | % by wt. | Other Additives | % by wt. | Temp. °F. | Viscosity cps. | Surface Tension dynes/cm. | Foam/liquid ratio | Hydraulic Pressure (psig) | t½ min. | Foam Density (g/cc) |
|---|---|---|---|---|---|---|---|---|---|---|---|---|---|
| EVA (Elvax 410) |  | 0 |  | 0 |  | 0 | 350 | 28,000 | 22.4 |  |  |  | 0.37 |
|  | nonionic | 0.25 | fused silica | 0.1 |  | 0 | 350 | 28,000 |  |  |  |  | 0.34 |
|  |  | 0 |  | 0 | wax | 30 | 350 | 3,100 | 19.5 | 1.77 | 1100–1200 | 5.9 |  |
|  |  | 0 | fused silica | 0.1 | wax | 30 | 350 | 3,100 |  | 1.69 | 1100–1200 | 12.5 |  |
|  | nonionic | 1.0 |  | 0 | wax | 30 | 350 | 3,100 |  | 1.98 | 1100–1200 | 5.1 |  |
|  | nonionic | 1.0 | fused silica | 0.1 | wax | 30 | 350 | 3,100 |  | 1.68 | 1100–1200 | 15.0 |  |
|  | cationic | 1.0 |  | 0 | wax | 30 | 350 | 3,100 |  | 1.75 | 1200–1300 | 3.6 |  |
| Polyethylene (AC-635) |  | 0 |  | 0 |  | 0 | 350 | 2,800 | 23.3 | 1.40 | 1300–1400 | 18.2 |  |
|  |  | 0 | fused silica | 0.1 |  | 0 | 350 | 2,800 |  | 1.57 | 1300–1400 | 28.1 |  |
|  | nonionic | 1.0 |  | 0 |  | 0 | 350 | 2,800 |  | 1.44 | 1300–1400 | 36.3 |  |
|  | nonionic | 1.0 | fused silica | 0.1 |  | 0 | 350 | 2,800 |  | 1.48 | 1300–1400 | 97.5 |  |
|  | anionic | 1.0 |  | 0 |  | 0 | 350 | 2,800 |  | 1.53 | 900–1000 | 46.0 |  |
|  | cationic | 1.0 |  | 0 |  | 0 | 350 | 2,800 |  | 1.42 | 900–1000 | 77.5 |  |
|  |  | 0 | carbon black | 0.1 |  | 0 | 350 | 2,800 |  | 1.27 | 900–1000 | 97.4 |  |
|  |  | 0 | TiO₂ | 0.1 |  | 0 | 350 | 2,800 |  | 1.46 | 900–1000 | 105.0 |  |
|  | cationic | 1.0 | fused silica | 0.1 |  | 0 | 350 | 2,800 |  | 1.75 | 900–1000 | 114.0 |  |
| Polyester (Terrell 6100) |  | 0 |  | 0 |  | 0 | 420 |  |  | 1.90 | 1700–1800 |  | 0.43 |
|  | nonionic | 1.0 | fused silica | 0.1 |  | 0 | 420 |  |  | 2.37 | 1700–1800 |  | 0.49 |
| Polypropylene (A-FAX-500) |  | 0 |  | 0 | BHT | 0.3 | 420 | 1,900 | 20.2 | 1.61 | 900–1000 | 55.7 | 0.47 |
|  |  | 0 | fused silica | 0.1 | BHT | 0.3 | 420 | 1,900 |  | 1.60 | 900–1000 | 58.6 |  |
|  | nonionic | 1.0 |  | 0 | BHT | 0.3 | 420 | 1,900 |  | 1.69 | 900–1000 | 49.5 |  |
|  | nonionic | 1.0 | fused silica | 0.1 | BHT | 0.3 | 420 | 1,900 |  | 1.62 | 900–1000 | 56.4 |  |
|  | nonionic | 1.0 | fused silica | 0.1 | BHT | 0.3 | 400 | 3,100 |  | 1.68 | 1000–1100 |  |  |
| Polyamide (Versalon 1138) |  | 0 |  | 0 |  | 0 | 420 | 2,800 | 30.7 | 1.54 | 1400–1500 | 1.0 | 0.39 |
|  | nonionic | 1.0 |  | 0 |  | 0 | 420 | 2,800 | 18.8 | 1.48 | 1400–1500 | 2.0 |  |
|  |  | 0 | fused silica | 0.1 |  | 0 | 420 | 2,800 | 20.8 | 1.50 | 1400–1500 | 1.5 |  |
|  | nonionic | 1.0 | fused silica | 0.1 |  | 0 | 420 | 2,800 | 18.3 | 1.54 | 1400–1500 | 3.0 |  |

Referring to the Table, the nonionic surfactant employed was Triton X-100, identified above. The cationic surfactant employed was dimethyl dicoco ammonium chloride and anionic surfactant was dioctyl alkali metal sulfosuccinate. The fused silica employed as a solid surfactant was "Cab-O-Sil", supra, having a surface area of approximately 900 square meters per gram (Standard grade M5 by Cabot). The fused silica is a colloidal silica where the particles are sintered together in chain-line formations. The designation "BHT" is an abbreviation for butylated hydroxytoluene. The Table thus embodies a tabulation of a number of operating examples employing thermoplastic adhesive compositions which have been processed according to the method of stabilization of this invention. The data tabulated were obtained with a hot melt apparatus similar to that described for FIG. 1. It is important to emphasize that the results reported in the Table are valid to be reproduced only under all the conditions under which they were obtained. These conditions include the overall foam to liquid ratio at the time of formation of the foam. These data are also relative to the amount of air dissolved in the polymeric hot melt before foam formation whether or not the polymeric hot melt is or is not saturated with dissolved air at the pressure and temperature in effect before foaming. Hydraulic pressure during dispensing of the pressurized polymeric liquid hot melt should be observed. All of these studies to determine the life of the foam were dynamic.

Figure 6A:
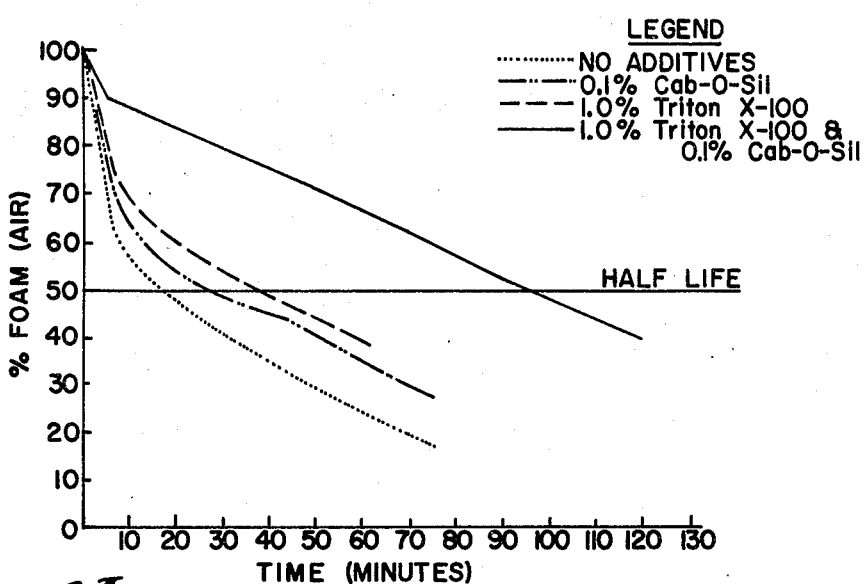
FIGS. 6A to 6D are plots of stability data illustrating the stabilizing effects of the method of this invention.

The tabular data were obtained with adhesive compositions both with and without surfactants, as indicated on a percent by weight basis. In certain of the ethylene vinylacetate (EVA) and polypropylene adhesives, wax and BHT additives were employed. The operating temperature for a particular composition which is processed throughout the melt tank, transfer and dispensing lines is indicated in the Table in degrees Fahrenheit. The viscosity and surface tension measurements were made according to the methods described above. The foam stabilities, i.e., half-lives (t ½), were determined as illustrated by the plots in FIG. 6 of the drawings. The foam life was determined according to the formula:

Percent foam (air) = $(V_E - V_i/V_O - V_i) \times 100$ $V_E$ = total volume of foam and liquid at each time interval from experimental data $V_i$ = volume of liquid contained in a graduated cylinder after de-airing $V_O$ = initial volume of foam from first experimental point data With reference to the above formula and FIG. 6A of the drawing, the half-life for foamed polyethylene at 350° F. was obtained and reported in the Table. FIG. 6A is a plot in terms of percent foam vs. time lapsed for foam sample dispensed from an apparatus of the type discussed above with reference to FIG. 1. A sample of foam was taken from an outlet port similar to that shown in the drawing at point 32 through a dispensing head into a 250 cc graduated cylinder at a beginning foam thickness of 6 inches (150 cc). That sample is given the 100% foam value plotted in FIG. 6. Then, the time in minutes for the total volume of foam and liquid at each time interval was observed until the volume of liquid in the graduated cylinder was de-aired. With reference to FIG. 6A, then, it may be observed that the polyethylene polymer, without any additives, had a stability (t ½) of 18.2 minutes. Upon the addition of a solid surfactant, i.e., fused silica in an amount of about 0.1%, the half-life was improved to about 28.1 minutes. Upon the separate addition of the nonionic surfactant in an amount of about 1%, the half-life of the foam polyethylene was improved to about 36.3 min. Upon the combination of the soluble and solid phase surfactants in the same amounts to the polyethylene melt, the half-life was improved to 97.5 minutes. Therefore, the data from the Table and FIG. 6A with respect to the polyethylene thermoplastic material clearly illustrate that either a soluble or solid surfactant material when separately added, in accordance with the principles of this invention, advantageously stabilizes the dispersion of gas in a thermoplastic melt material. Furthermore, as demonstrated by the response of the combined soluble and solid surfactants, the stabilization of the combination far exceeds the expected algebraic sum of the activity of the individual components. Such synergistic results are indeed remarkable.

Figure 2:
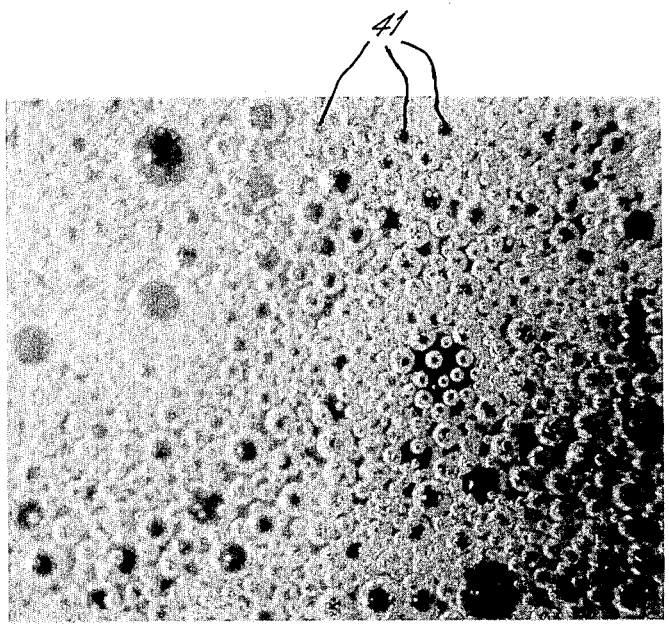
FIG. 2 is a photograph magnified 20 times of a cross-section through a polyethylene adhesive foam made without a surfactant.
Figure 3:
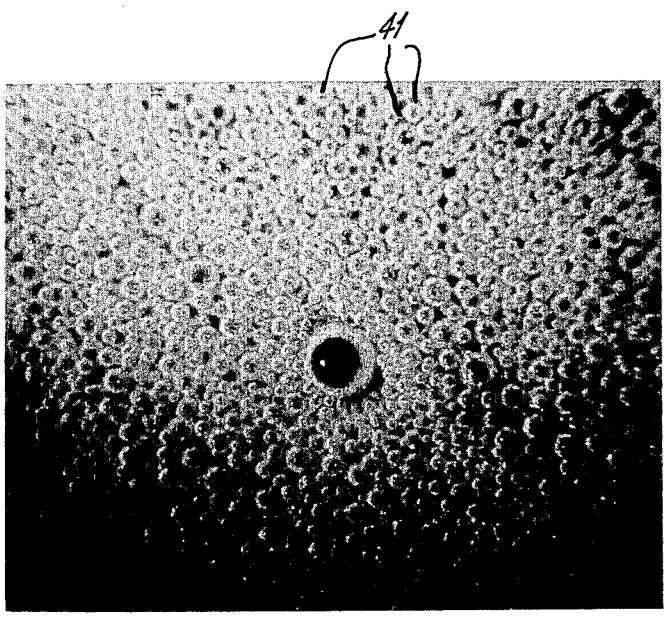
FIG. 3 is a photograph magnified 20 times of a cross-section through a polyethylene adhesive foam made in accordance with the practice of this invention.

The character of foams produced with or without the surfactants according to the principles of this invention are illustrated by the drawings FIGS. 2-5. In FIGS. 2 and 3, a polyethylene based adhesive composition, i.e., A-3, foamed without and with additives is respectively depicted. With reference to these FIGS. 2-3, the foam produced with surfactant stabilization is of more uniform and finer distribution of cell sizes than in the material without surfactants. There is a significant improvement offered by this invention in cell size and uniformity of distribution, with resultant enhanced bonding and penetration of the adhesive foam into porous substrates. Furthermore, as developed above, control of foam formation upon dispensing can be achieved with this invention, whereas such control is not available for the use of the A-3 polyethylene alone. With reference to FIGS. 2 and 3, the foam 40 has closed air cells 41 spaced throughout the foam and created by the entrapment of air bubbles evolved from a solution of gas in the liquid molten adhesive. These cells 41 are formed after the liquid adhesive-air solution is dispensed from an adhesive dispenser of the type illustrated in FIG. 1.

Figure 4:
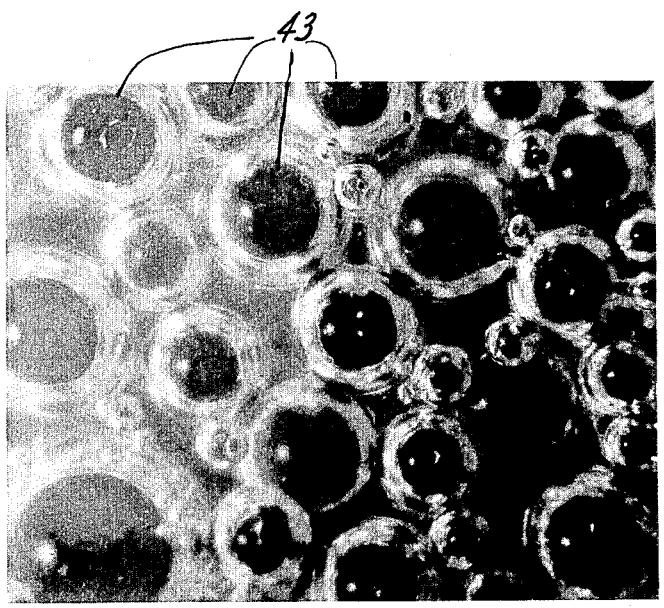
FIG. 4 is a photograph magnified 20 times of a cross-section through an ethylene vinylacetate adhesive foam made without a surfactant.
Figure 5:
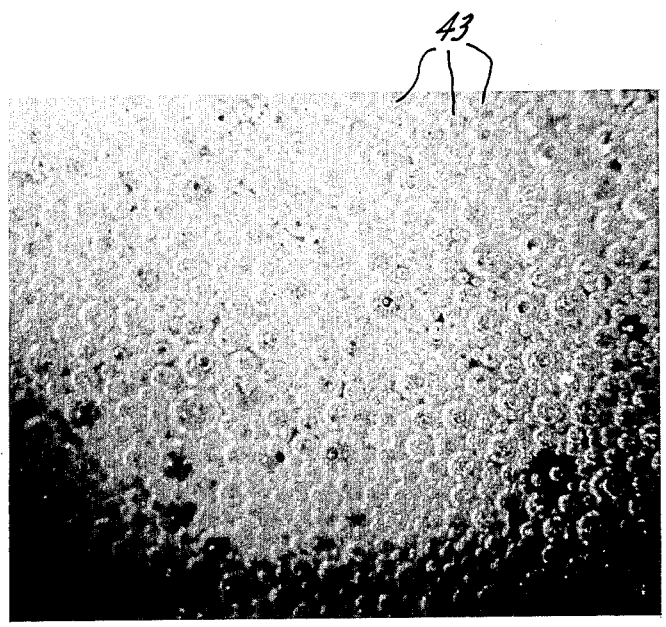
FIG. 5 is a photograph magnified 20 times of a cross-section through an ethylene vinylacetate adhesive foam made with stabilizing surfactants in accordance with this invention.

An ethylene vinylacetate adhesive composition is illustrated by FIGS. 4 and 5, without and with foam stabilization, respectively. FIG. 5 clearly illustrates that a more uniform and finer distribution of foam cells is achieved by stabilization according to the principles of this invention.

Figure 6B:
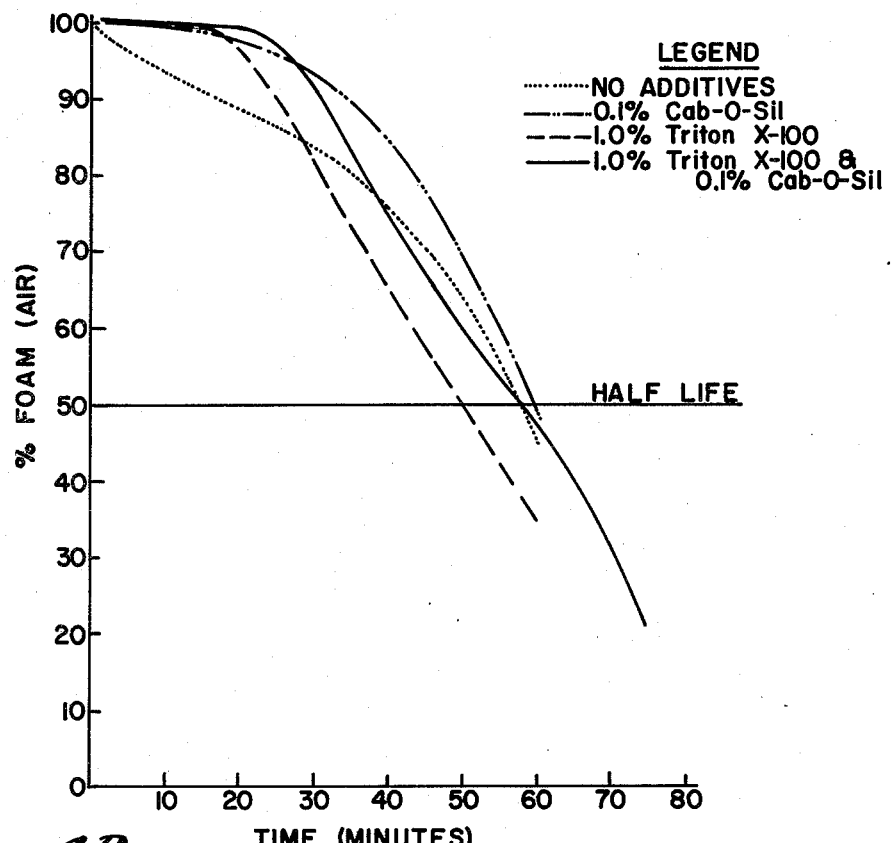

Half-life stabilities reported in the Table for polypropylene and ethylene vinylacetate (70% EVA, 30% wax) were determined by FIGS. 6B and C. The EVA/wax and polypropylene curves represent opposite extreme prototypes. Briefly, the difference in these two examples is explained by the two basic foam decay mechanisms (1) diffusion of the bubble gas from small bubbles into big bubbles and (2) drainage of the liquid phase downward (due to gravity) out from between the bubbles. It is also necessary to keep in mind the physical characteristics of surface tension, viscosity, diffusion coefficient and the gas solubility in liquid. Polypropylene is several times a better barrier material than polyethylene because of its molecular architecture, hence it resists diffusion several times more than polyethylene or EVA/wax systems. Therefore, the delay in diffusion decay appears in FIG. 6B at the beginning for the polypropylene material during which time the liquid is draining from between the bubbles bringing them closer together. When they get a certain distance apart, diffusion increases, as the distance between bubbles decreases and, therefore, the curve of polypropylene falls off toward zero with time. In contrast, EVA/wax has a very low resistance to diffusion because of the 30% wax diluent, hence the curve starts and falls with no detected delay within the limit of the experimental half-life. However, it can be observed that improvements in regard to stability are evident in the latter portions on these curves.

Figure 6C:
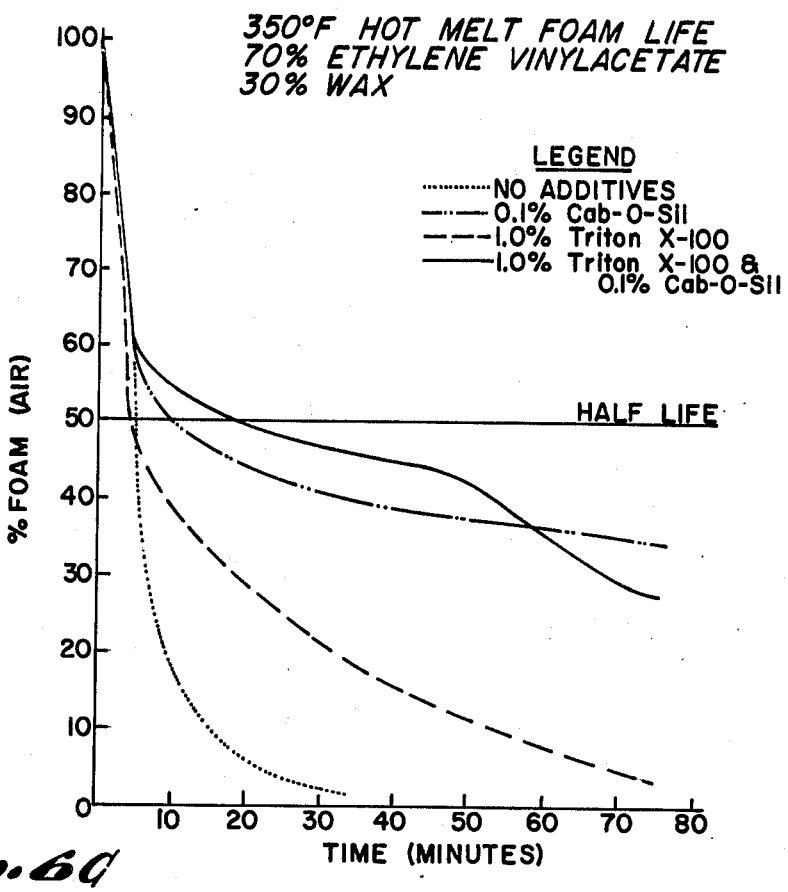
Figure 6D:
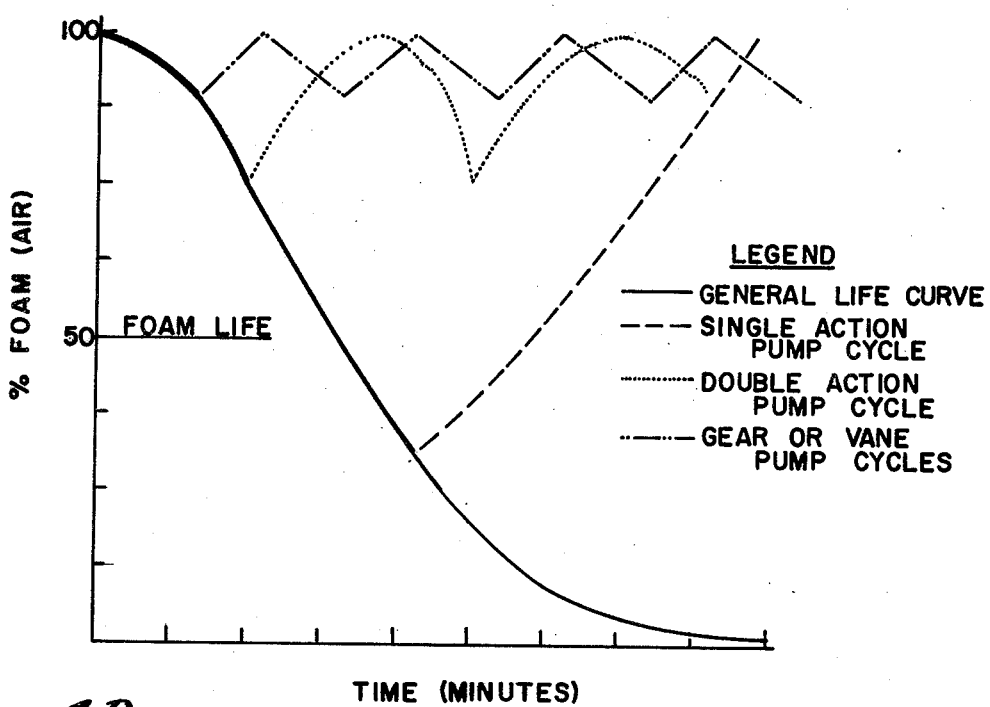

From FIGS. 6A-C, a generalized curve shown by the solid line in 6D represents the best present knowledge of the overall situation. All of the data presented in the Table and FIGS. 6A-C are dynamic, as mentioned above. With reference to the generalized FIG. 6D, the solid black line represents foam life measured on a pressurized sample from point of pressure release (100% foam, 0 time) to total decay (0% foam, infinite time). In practice of the process, such a foam will decay, as indicated by the broken curves, around the vicinity of any pressurizing device intake or gas dispersing device, whether separate or combined. When a combined dispersing-gear pump device undergoes one or more successive dispersing, pressurizing, dispersing, pressurizing, etc., cycles, the foam bubble system will also cycle as indicated on the diagram by the curves (FIG. 6D). Dependent upon the design of the device, the cycling will be either as in the dashed curve (single action reciprocating pump); intermediate as in the dotted curve (double action reciprocating pump); or shallow as in the dotted and dashed curve (gear pump with many teeth of limited depth or rotary sliding vane pump) (FIG. 6D). The area between the curves and the horizontal line at 100% foam is an inverse measure of the efficiency of the system-device. The ideal device will succeed in paralleling the 100% line, converting the entire (100%) bubble assembly into pressurized liquid phase in one cycle. Total failure is exemplified by two extreme cases: (1) very deep cycle with no finite recovery and (2) finite recovery, infinite number of cycles (no through-put).

The half-life values of the Table for compositions containing 0.1% carbon black, 0.1% titanium dioxide, 1% Aerosol OT, or 1% dimethyl base coco ammonium chloride were determined in a manner similar to that of FIGS. 6A-C. Each of such half-life curves demonstrates a very significant stabilization of the thermoplastic polymeric compositions in question. It should be mentioned that the tabulated polyester example demonstrated enhanced stability by the employment of the surfactants according to this invention. However, after approximately 80 minutes of testing, a skin formed across the top of the samples in the graduated cylinder and the experiment was terminated.

Other thermoplastic polymers have been employed to make structural foam bodies using the method of this invention. For example, polystyrene was melted and foamed at 520° F. using a resin of 15 melt index and a viscosity of 86,000 cps. at 580° F. Polybutylene terephthalate having a viscosity of 143,000 cps. at 500° F. was melted and foamed at 500° F. The foaming method was conducted in a manner similar to that discussed above with 0.1% Cab-O-Sil and 1% Triton X-100, except that the foams were dispensed into cup molds to produce structural moldings upon cooling having densities (g/cm$^3$) of 0.49 and 0.57, respectively.

In view of the above description and detailed operating examples, it will become apparent that there are other obvious modifications in accordance with the principles of this invention. Such modifications may be made by one of ordinary skill in the art without departing from the spirit and scope hereof.

What is claimed is:

1. The method of bonding with a foamed thermoplastic adhesive material which comprises
   first stabilizing a dispersion of gas bubbles in a molten thermoplastic material at about atmospheric pressure by incorporating a surfactant in the molten material in a sufficient stabilizing amount,
   subsequently pressurizing said stabilized dispersion to form a hot solution of the gas in the molten thermoplastic material,
   dispensing said hot solution under lower pressure whereby said gas is released from said solution to form a hot foamed material, and
   compressing the hot foam between two substrates to force the gas from the foam and to form a bond between the substrates.

2. The method of claim 1 wherein said pressurization is subsequently conducted at a pressure on the order of about 300 to about 1800 psig.

3. The method of claim 2 wherein said pressurization is conducted by means of a fluid pressure energy translating device.

4. The method of claim 3 wherein said device is a pump.

5. The method according to claim 1 comprising the further step of cooling the compressed adhesive to form upon solidification a bond between said substrates.

6. The method according to claim 5 wherein at least one said substrate is porous and said foam upon compression penetrates said substrate to form said bond.

7. The method according to claim 1 wherein said thermoplastic adhesive material contains a polymer selected from the group consisting of polyethylene, polypropylene, polyester, polyesteramide, polyurethane, polyamide and polyethylene vinylacetate.

8. The method of claim 1 wherein said dispersion comprises air dispersed in said thermoplastic adhesive and the step of pressurization is conducted by means of a pump.

9. The method of claim 1 wherein said stabilization is conducted by controlling the surface tension of said molten material within the range of about 10–40 dynes/cm., the viscosity being controlled within the range of about 500–1,000,000 cps and wherein the gas solubility at said dispensing pressure is within the range of about ½–20 cm$^3$ gas/gm of thermoplastic material.

10. The method of claim 1 wherein said surfactant is a mixture of a soluble surfactant contained in an amount of about 0.1 to about 5% by weight and a solid surfactant contained in an amount of about 0.01 to about 1% by weight.

11. The product produced by the method of claim 1.

12. The product produced by the method of claim 5.

13. The product produced by the method of claim 6.

14. The product produced by the method of claim 7.

15. A method of making foamed thermoplastic material which comprises
   first stabilizing a dispersion of gas bubbles in a molten thermoplastic material at substantially atmospheric pressure by incorporating a surfactant in the molten material in a sufficient stabilizing amount,
   subsequently pressurizing said stabilized dispersion to form a hot solution of the gas in the molten thermoplastic material, and
   dispensing said hot solution under lower pressure whereby said gas is released from said solution to form a foamed material.

16. The method of claim 1 wherein said gas is air.

17. The method of claim 1 wherein said pressurizing step is conducted at pressures on an order of about 100 to about 2,000 psig.

18. The method of claim 1 wherein said pressurizing step is conducted by means of a pump.

19. The method of claim 1 wherein air is dispersed in the molten thermoplastic material and stabilized under substantially atmospheric pressure followed by said pressurization by means of a fluid pressure translating device.

20. The method of claim 19 wherein said device is a pump.

21. The method of claim 1 wherein said surfactant is contained in an amount of about 0.1% to about 5% by weight.

22. The method of claim 1 wherein said surfactant is a solid phase surfactant.

23. The method of claim 22 wherein said solid phase surfactant is a finely divided inert material.

24. A method of making foamed thermoplastic material which comprises
   first stabilizing a dispersion of gas bubbles in a molten thermoplastic material by incorporating a surfactant in the molten material in a sufficient stabilizing amount, wherein said surfactant is a mixture of a soluble surfactant and a finely divided solid surfactant,
   subsequently pressurizing said stabilized dispersion to form a hot solution of the gas in the molten thermoplastic material, and
   dispensing said hot solution under lower pressure whereby said gas is released from said solution to form a foamed material.

25. The method of claim 11 wherein said soluble and solid surfactants are present in a ratio to provide a synergistic stabilizing effectiveness to said dispersion.

26. The method of claim 24 wherein said soluble surfactant is contained in an amount of about 0.1 to about 5% by weight and said solid surfactant is contained in an amount of about 0.01 to about 1% by weight.

27. The method of claim 1 wherein said surfactant is selected from the group consisting of anionic, cationic and non-ionic surfactants, and mixtures thereof.

28. The method of claim 1 wherein said thermoplastic material comprises a polymer selected from the group consisting of polymers of ethylenically unsaturated monomers, polymers of conjugated diene monomers, polyesters, polyamides, polyesteramides and polyurethanes, and copolymers of said monomers.

29. The method of claim 1 wherein said stabilization is conducted by controlling the surface tension of said molten material within the range of about 10–40 dynes/cm., the viscosity being controlled within the range of about 500–1,000,000 cps and wherein the gas solubility at said dispensing pressure is within the range of about ½–20 cm$^3$ gas/gm of thermoplastic material.

30. The method of claim 1 which comprises the additional step of compressing the foamed material between two substrates to force the gas from the foam and to form a bond between the substrates.

31. The method of claim 30 comprising the further step of cooling the compressed material to form upon solidification a bond between the substrates.

32. The product produced by the method of claim 1.
33. The product produced by the method of claim 24.
34. The product produced by the method of claim 25.
35. The product produced by the method of claim 27.
36. The product produced by the method of claim 28.

* * * * *

UNITED STATES PATENT AND TRADEMARK OFFICE
CERTIFICATE OF CORRECTION

PATENT NO. : 4,156,754

DATED : May 29, 1979

INVENTOR(S) : Walter H. Cobbs, Jr. et al

It is certified that error appears in the above-identified patent and that said Letters Patent are hereby corrected as shown below:

Col. 7, line 62, "outlets" should be --outlet--

Col. 14, line 14, "1" should be --15--

Col. 14, line 15, "1" should be --15--

Col. 14, line 18, "1" should be --15--

Col. 14, line 20, "1" should be --15--

Col. 14, line 27, "1" should be --15--

Col. 14, line 30, "1" should be --15--

Col. 14, line 48, "11" should be --24--

Col. 14, line 56, "1" should be --15--

Col. 14, line 59, "1" should be --15--

Col. 14, line 65, "1" should be --15--

UNITED STATES PATENT AND TRADEMARK OFFICE
CERTIFICATE OF CORRECTION

PATENT NO. : 4,156,754

DATED : May 29, 1979

INVENTOR(S) : Walter H. Cobbs, Jr. et al

It is certified that error appears in the above-identified patent and that said Letters Patent are hereby corrected as shown below:

Col. 15, line 4, "1" should be --15--

Col. 16, line 3, "1" should be --15--

Signed and Sealed this

Eleventh Day of March 1980

[SEAL]

Attest:

SIDNEY A. DIAMOND

Attesting Officer

Commissioner of Patents and Trademarks